(12) United States Patent
Wang (10) Patent No.: US 11,250,292 B2
(45) Date of Patent: Feb. 15, 2022

(54) METHOD AND APPARATUS FOR GENERATING INFORMATION

(71) Applicants: Beijing Jingdong Shangke Information Technology Co., Ltd, Beijing (CN); Beijing Jingdong Century Trading Co., Ltd., Beijing (CN)

(72) Inventor: Lei Wang, Beijing (CN)

(73) Assignees: Beijing Jingdong Shangke Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 24 days.

(21) Appl. No.: 16/959,605

(22) PCT Filed: Jan. 29, 2019

(86) PCT No.: PCT/CN2019/073654
§ 371 (c)(1),
(2) Date: Jul. 1, 2020

(87) PCT Pub. No.: WO2019/149186
PCT Pub. Date: Aug. 8, 2019

(65) Prior Publication Data
US 2020/0387744 A1     Dec. 10, 2020

(30) Foreign Application Priority Data
Feb. 1, 2018 (CN) .......................... 201810102618.7

(51) Int. Cl.
*G06K 9/62* (2006.01)
*G06K 9/00* (2006.01)
*G06N 3/08* (2006.01)

(52) U.S. Cl.
CPC ....... *G06K 9/6215* (2013.01); *G06K 9/00671* (2013.01); *G06K 9/6256* (2013.01); *G06N 3/08* (2013.01)

(58) Field of Classification Search
CPC ............. G06K 9/6215; G06K 9/00671; G06K 9/6256; G06K 9/00664; G06K 9/4628;
(Continued)

(56) References Cited

U.S. PATENT DOCUMENTS

2007/0269107 A1    11/2007  Iwai et al.
2010/0278433 A1*   11/2010  Ooishi ............... H04N 5/23229
                                                        382/195
(Continued)

FOREIGN PATENT DOCUMENTS

CN    106203242 A    12/2016
CN    106980880 A     7/2017
CN    107239780 A    10/2017

OTHER PUBLICATIONS

Internationa Search Report and Written Opinion for International Application No. PCT/CN2019/073654, dated Apr. 24, 2019, 5 pages.

*Primary Examiner* — Michael S Osinski
(74) *Attorney, Agent, or Firm* — RatnerPrestia (57) ABSTRACT

Disclosed by the present disclosure are a method and apparatus for generating information. A specific embodiment of the method comprises: obtaining a first image and a second image; inputting the first image and the second image respectively into a pre-trained detection and recognition model, to obtain an annotated first image and an annotated second image, where an annotation comprises an image box surrounding a target object in the image, and the detection and recognition model is configured to represent the correspondence relationship between an image and an annotated image; and inputting the annotated first image and (Continued)

the annotated second image to a pre-trained matching model to obtain a matching degree between the annotated first image and the annotated second image, where the matching model is used to characterize a corresponding relationship between a pair of images and the matching degree between the images.

15 Claims, 6 Drawing Sheets

(58) Field of Classification Search
CPC ............... G06K 9/6201; G06K 9/3241; G06K 9/00771; G06K 9/2054; G06K 9/00261; G06K 9/00268; G06K 9/00295; G06K 9/00335; G06K 9/00362; G06N 3/08; G06N 3/084; G06N 3/0445; G06N 3/0454; G06N 20/10; G06F 16/953; G06F 16/583; G06F 17/30864; G06F 17/30247; G06T 2207/10016; G06T 2207/30241; G06T 2207/10021; G06T 2207/10028; G06T 2207/20021
See application file for complete search history.

(56) References Cited

U.S. PATENT DOCUMENTS

| | | | |
|---|---|---|---|
| 2011/0050958 A1* | 3/2011 | Kai | H04N 5/772 348/231.99 |
| 2014/0247963 A1* | 9/2014 | Lin | G06K 9/6202 382/103 |
| 2014/0341430 A1* | 11/2014 | Ryu | G06T 3/60 382/103 |
| 2015/0049091 A1* | 2/2015 | Nachman | G06F 16/5854 345/467 |
| 2015/0205997 A1* | 7/2015 | Ma | G06K 9/00261 382/118 |
| 2015/0302505 A1* | 10/2015 | Di | G06K 9/00362 705/26.7 |
| 2015/0350523 A1* | 12/2015 | Kinoshita | G06K 9/3241 348/352 |
| 2016/0210512 A1* | 7/2016 | Madden | G06K 9/00771 |
| 2016/0275695 A1* | 9/2016 | Luczak | G06K 9/4642 |
| 2016/0343411 A1* | 11/2016 | Sirot | G06T 7/246 |
| 2017/0061241 A1* | 3/2017 | Rastgar | G06K 9/6215 |
| 2017/0069090 A1* | 3/2017 | Okumura | G06K 9/00785 |
| 2017/0083792 A1* | 3/2017 | Rodriguez-Serrano | G06T 7/10 |
| 2017/0301107 A1* | 10/2017 | Sasaki | B60R 1/00 |
| 2017/0308262 A1* | 10/2017 | Murase | G06F 3/04812 |
| 2017/0330208 A1* | 11/2017 | Wakako | G06Q 30/0201 |
| 2018/0025249 A1* | 1/2018 | Liu | G06N 3/04 382/158 |
| 2018/0039853 A1* | 2/2018 | Liu | G06K 9/72 |
| 2018/0053294 A1* | 2/2018 | Rastgar | G06K 9/00369 |
| 2018/0330169 A1* | 11/2018 | van Hoof | G08B 13/19613 |
| 2018/0349708 A1* | 12/2018 | van Hoof | G08B 13/19656 |
| 2019/0045136 A1* | 2/2019 | Nakayama | H04N 5/232 |
| 2019/0244030 A1* | 8/2019 | Yoshinaga | G06T 7/246 |
| 2019/0297297 A1* | 9/2019 | Zhang | G11B 27/036 |
| 2019/0347530 A1* | 11/2019 | Francini | G06T 7/11 |
| 2020/0218888 A1* | 7/2020 | Gong | G06N 20/00 |
| 2020/0327681 A1* | 10/2020 | Li | G06T 7/75 |
| 2021/0089816 A1* | 3/2021 | Amon | G06T 7/143 |

* cited by examiner

METHOD AND APPARATUS FOR GENERATING INFORMATION

CROSS-REFERENCE TO RELATED APPLICATIONS

This application is a national stage of International Application No. PCT/CN2019/073654, filed on Jan. 29, 2019, which claims the priority of Chinese Patent Application No. 201810102618.7, the contents of which are incorporated herein by reference in their entirety.

TECHNICAL FIELD

Embodiments of the present disclosure relate to the field of computer technology, and more particularly, to a method and apparatus for generating information.

BACKGROUND

As more and more images are displayed on the Internet, image processing and application is a hot research field at present. Among them, image retrieval based on an image, for example, according to a given image, quickly and accurately finding some images that best match the given image in a large number of images on the Internet is an ongoing research direction in the field of image processing.

SUMMARY

Embodiments of the present disclosure provide a method and an apparatus for generating information.

According to a first aspect, some embodiments of the present disclosure provide a method for generating information, the method comprising: acquiring a first image and a second image; inputting, respectively, the first image and the second image into a pre-trained detection and recognition model, to obtain an annotated first image and an annotated second image, wherein an annotation includes an image box surrounding a target object in an image, and the detection and recognition model is used to characterize a correspondence relationship between the image and an annotated image; and inputting the annotated first image and the annotated second image to a pre-trained matching model to obtain a matching degree between the annotated first image and the annotated second image, wherein the matching model is used to characterize a corresponding relationship between a pair of images and the matching degree between the images.

In some embodiments, the detection and recognition model is trained by: acquiring a plurality of sample images and an annotated sample image corresponding to each of the plurality of sample images; and training, by using a machine learning method, with each sample image in the plurality of sample images as an input and the annotated sample image corresponding to each sample image in the plurality of sample images as an output, to obtain the detection and recognition model.

In some embodiments, the matching model is trained by: acquiring a plurality of pairs of annotated sample images and a matching degree between images in each pair of annotated sample images; training, by using a machine learning method, with each pair of annotated sample images in the plurality of pairs of annotated sample images as an input and the matching degree between the images in each pair of annotated sample images as an output, to obtain the matching model.

In some embodiments, the matching model comprises a first convolutional neural network and a second convolutional neural network.

In some embodiments, the inputting the annotated first image and the annotated second image to the pre-trained matching model to obtain the matching degree between the annotated first image and the annotated second image comprises: inputting the annotated first image to the first convolutional neural network, to obtain an output feature vector of a target object in the annotated first image; inputting the annotated second image to the second convolutional neural network, to obtain an output feature vector of a target object in the annotated second image; performing a distance calculation on the two obtained output feature vectors, to obtain a matching degree between the annotated first image and the annotated second image.

According to a second aspect, some embodiments of the present disclosure provide an apparatus for generating information, the apparatus includes: a receiving unit, configured to acquire a first image and a second image; a first inputting unit, configured to respectfully input the first image and the second image into a pre-trained detection and recognition model, to obtain an annotated first image and an annotated second image, wherein an annotation includes an image box surrounding a target object in the image, and the detection and recognition model is used to characterize a correspondence relationship between the image and an annotated image; and a second inputting unit, configured to input the annotated first image and the annotated second image to a pre-trained matching model to obtain a matching degree between the annotated first image and the annotated second image, wherein the matching model is used to characterize a corresponding relationship between a pair of images and the matching degree between the images.

In some embodiments, the detection and recognition model is trained by: acquiring a plurality of sample images and an annotated sample image corresponding to each of the plurality of sample images; and training, by using a machine learning method, with each sample image in the plurality of sample images as an input and the annotated sample image corresponding to each sample image in the plurality of sample images as an output, to obtain the detection and recognition model.

In some embodiments, the matching model is trained by: acquiring a plurality of pairs of annotated sample images and a matching degree between images in each pair of annotated sample images; training, by using a machine learning method, with each pair of annotated sample images in the plurality of pairs of annotated sample images as an input and the matching degree between the images in each pair of annotated sample images as an output, to obtain the matching model.

In some embodiments, the matching model comprises a first convolutional neural network and a second convolutional neural network, the convolutional neural network comprises a convolutional layer, a pooling layer, and a fully connected layer.

In some embodiments, the second inputting unit includes: an extraction subunit, configured to input the annotated first image to the first convolutional neural network, to obtain an output feature vector of a target object in the annotated first image; inputting the annotated second image to a second convolutional neural network, to obtain an output feature vector of a target object in the annotated second image; and a calculation subunit, configured to perform a distance calculation on the two obtained feature vectors, to obtain a matching degree between the annotated first image and the annotated second image.

According to a third aspect, some embodiments of the present disclosure provides an electronic device, the electronic device includes: one or more processors; storage means for storing one or more programs; when the one or more programs are executed by the one or more processors, causing the one or more processors to implement the method according to any one of the embodiments of the first aspect.

According to fourth aspect, some embodiments of the present disclosure provides a computer readable storage medium having stored thereon a computer program, wherein the program, when executed by a processor, implements the method according to any one of the embodiments of the first aspect.

The method and apparatus for generating information, by first inputting, respectfully, the acquired first image and second image into a pre-trained detection and recognition model, to obtain an annotated first image and an annotated second image, and then inputting the annotated first image and the annotated second image into a pre-trained matching model, to obtain the matching degree between the annotated first image and the annotated second image. Since the target objects in the images are first annotated by detection and matching model, and then the matching degree between the target objects in the two annotated images, instead of the matching degree between the first image and the second image as a whole, is calculated by the matching model, interference of other objects in the image other than the target object on the calculation of matching degree is reduced, thereby improving accuracy of the matching degree calculation result.

DESCRIPTION OF THE DRAWINGS

Other features, objectives and advantages of the present disclosure will become more apparent upon reading the detailed description to non-limiting embodiments with reference to the accompanying drawings.

DETAILED DESCRIPTION

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
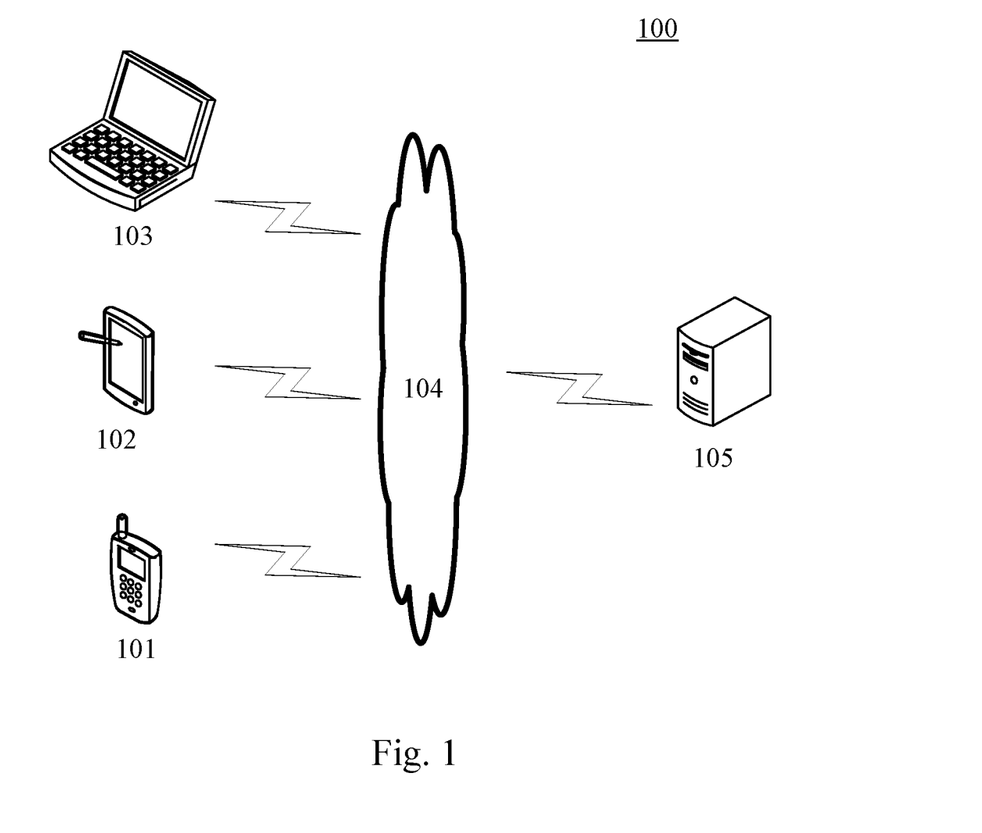
FIG. 1 is a diagram of an exemplary system architecture in which an embodiment of the present disclosure may be applied.

FIG. 1 illustrates an exemplary system architecture 100 to which the method for generating information or apparatus for generating information of the present disclosure may be implemented.

As shown in FIG. 1, the system architecture 100 may include terminal devices 101, 102, 103, a network 104, and a server 105. The network 104 serves as a medium for providing a communication link between the terminal devices 101, 102, 103 and the server 105. Network 104 may include various types of connections, such as wired or wireless transmission links, or optical fibers.

A camera may be installed on the terminal devices 101, 102 and 103, and various communication client applications, such as search applications, shopping applications, web browser applications, social platform software, and mailbox clients may also be installed on the terminal devices 101, 102 and 103. The terminal device may shoot an image through the camera, or may download an image through a communication client application, or the like. The server 105 may interact with the terminal devices 101, 102, 103 via the network 104, to acquire a first image and a second image to be matched, etc.

The terminal devices 101, 102, 103 may be various electronic devices having a display screen and supporting photographing, web browsing, including but not limited to a smartphone, a tablet computer, a laptop computer, a desktop computer, and the like.

The server 105 may be a server that provides various services, for example, an image processing server that processes images uploaded by the terminal devices 101, 102, 103. The image processing server may perform processing such as analyzing the acquired first image and the acquired second image, and feed back the processing result (for example, the annotated first image and the annotated second image) to the terminal device.

It should be noted that the method for generating information provided in the embodiments of the present disclosure may be executed by the server 105, and accordingly, the apparatus for generating information may be provided in the server 105. In addition, the method for generating information provided in the embodiments of the present disclosure may also be executed by the terminal devices 101, 102, and 103, and accordingly, the apparatus for generating information is provided in the terminal devices 101, 102, and 103.

It should be noted that the server 105 may also directly store the first image and the second image locally, and the server 105 may directly extract the first image and the second image locally for processing. In this case, the exemplary system architecture 100 may not include the terminal devices 101, 102, 103 and the network 104.

It should also be noted that an image processing application may also be installed in the terminal devices 101, 102, 103. The terminal devices 101, 102, 103 may also annotate the first image and the second image to be matched based on the image processing application. In this case, the method for generating information may be executed by the terminal devices 101, 102, 103, and accordingly, the apparatus for generating information may be provided in the terminal devices 101, 102, 103. In this case, the exemplary system architecture 100 may not include the server 105 and the network 104.

It should be understood that the number of terminal devices, networks and servers in FIG. 1 is merely illustrative. There may be any number of terminal devices, networks, and servers as desired for implementation.

Figure 2:
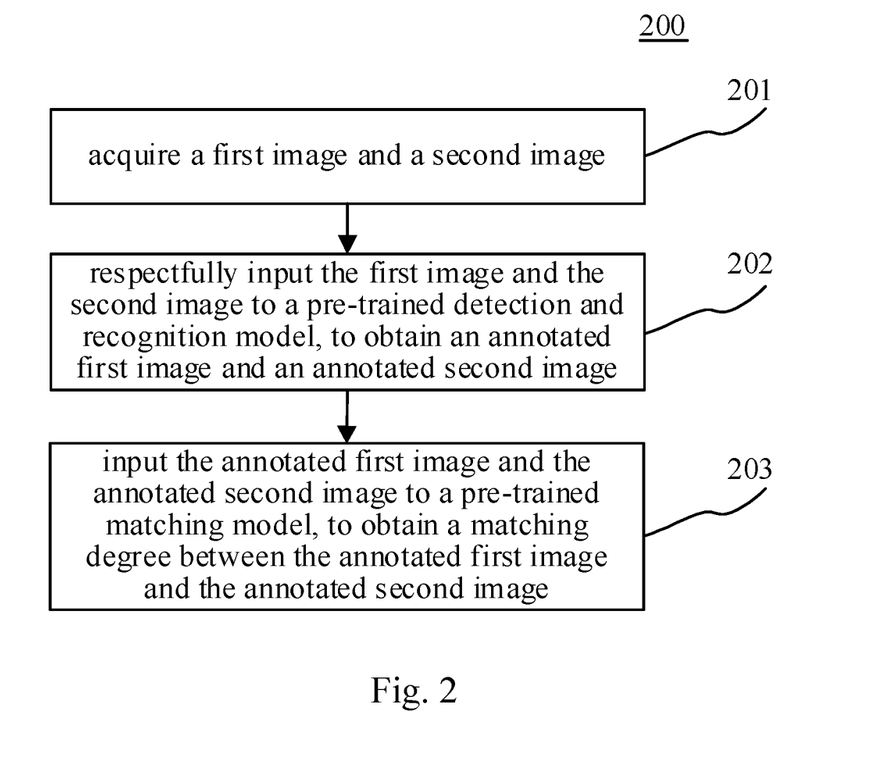
FIG. 2 is a flowchart of a method for generating information according to an embodiment of the present disclosure.

With further reference to FIG. 2, a flow 200 of a method for generating information in accordance with an embodiment of the present disclosure is shown. The method for generating information includes the steps of:

Step 201: acquire a first image and a second image.

In the present embodiment, an electronic device, such as the server 105 shown in FIG. 1, on which a method for generating information is operated, may acquire a first image and a second image from a terminal device through a wired connection mode or a wireless connection mode. The terminal device may be a camera, a mobile phone having a photographing function, a computer, or the like. The user may shoot an image by using the terminal device, and save the shot image to the terminal device. The terminal device may include various applications, such as search applications, web browsing applications, shopping applications, and the like. The user may download an image through the various applications described above, and save the downloaded image to the terminal device. It should be noted that the first image and the second image may be directly stored in the electronic device locally. In this case, the electronic device may directly acquire the first image and the second image locally. When the electronic device acquires the images locally, the network may be omitted.

In the present disclosure, in order to describe two images to be matched, the two images are named a first image and a second image, respectively, and it will be understood by those skilled in the art that the first or second image does not constitute a special limitation on the image.

In the present disclosure, the first image and the second image include therein at least one object. Here, the object may refer to any entity in the image, in particular, may include various article entities that are related to eating, wearing, housing, walking, using, and the like, for example, clothes, accessories, furniture, cars, or the like, may also include a character, an animal, a plant, or the like. It should be noted that the object is illustrative, and the present disclosure is not limited thereto, as long as the object is an entity in the image, the object falls within the scope of protection of the present disclosure.

In step 202, respectfully input the first image and the second image to a pre-trained detection and recognition model, to obtain an annotated first image and an annotated second image.

In the present embodiment, based on the first image and the second image acquired in step 201, the electronic device may input the first image and the second image to a pre-trained detection and recognition model, thereby obtaining an annotated first image and an annotated second image.

The annotated image refers to an image obtained by annotating a target object in the image, and the annotation includes an image box surrounding the target object in the image. Here, the target object may include one or more objects displayed on the image. The target object may be pre-designated by a person, or may be automatically designated according to a preset rule. For example, for an image whose content includes a person carrying a hand-held briefcase: assuming that the target object is pre-designated as the briefcase, the image can be annotated by surrounding the briefcase in the image with an image box; assuming that the target object is designated as the person, the image can be annotated by surrounding the person in the image with an image box. In addition, the target object may also be designated as one or more other entities in the background in addition to the briefcase and the person. Alternatively, the image box may have a variety of shapes, such as rectangles, ellipses, rhombus, or other polygons. The edges of the image box may be formed by solid lines or may be formed by dashed lines formed by hashing points along the edge of the target object.

In the present embodiment, the electronic device can train a detection and recognition model that can characterize the correspondence relationship between an image and an annotated image in a plurality of ways.

In some alternative implementations of the present embodiment, by summarizing a large number of images and an annotated image corresponding to each of the images, the electronic device may generate a correspondence relationship table storing correspondence relationships between the large number of images and the annotated images, and use the correspondence relationship table as the detection and recognition model. Accordingly, the electronic device may sequentially compare the acquired first image with the plurality of images in the correspondence relationship table. If an image in the correspondence relationship table is the same as or similar to the first image, an annotated image corresponding to the image in the correspondence relationship table is used as the annotated image corresponding to the first image. Then, the electronic device may perform the same operation as on the first image to obtain an annotated image corresponding to the second image.

In some alternative implementations of the present embodiment, the electronic device may first acquire a plurality of sample images and an annotated sample image corresponding to each of the plurality of sample images. The detection and recognition model may be a model obtained by training an initial detection and recognition model on basis of the samples by using a machine learning method in advance. The initial detection and recognition model may be an untrained Deep Neural Network (DNN) or a Deep Neural Network the training thereof is not completed. The layers of the initial detection and recognition model may be provided with initial parameters, which may be adjusted continuously during training. The initial detection and recognition model may be various untrained or not completely trained artificial neural networks or a model obtained by combining various types of untrained or not completely trained artificial neural networks. For example, the initial detection and recognition model may be an untrained convolutional neural network, or an untrained recurrent neural network, or a model obtained by combining an untrained convolutional neural network, an untrained recurrent neural network and an untrained fully connected layer.

In some alternative implementations of the present embodiment, the electronic device may first acquire a plurality of sample images and an annotated sample image corresponding to each of the plurality of sample images. The neural network, which is now well established for detection and recognition, is then trained to obtain the detection and recognition model. Among them, the neural network that is currently well established for detection and recognition may be R-CNN (Regions with Convolutional Neural Network), Faster R-CNN (Faster Regions with Convolutional Neural Network), R-FCN (Region-based Fully Convolutional Neural Network), SSD (Single Shot multibox Detector), YOLO (You Only Look Once), etc. For example, the R-CNN is used for training, an obtained sample image is first input to the R-CNN, and a certain number of candidate regions are extracted from the sample image by using an algorithm such as Selective-Search or Edge-Boxes. Then, the feature vector of each candidate region is extracted through several convolutional layers. Then, the extracted feature vector is input to a classifier such as an SVM (Support Vector Machine) for classification. Next, passing the classified candidate region through bounding box regression, to output the predicted candidates of the annotation window. Then, based on the difference between the predicted candidates of the annotation window and the coordinates of the image box in the above-described acquired annotated sample image corresponding to the above obtained sample image, the parameters of each convolutional layer are adjusted by the back propagation algorithm until the difference between the output predicted coordinates of the annotation window and the coordinates of the image box in the annotated sample image corresponding to the sample image is less than a certain threshold value, and then it is determined that the detection and recognition model is obtained. Alternatively, the electronic device may fine tune a model already trained on the basis of public data set, to forma detection and recognition model based on the acquired sample images and the annotated sample images corresponding to the sample images.

In some alternative implementations of the present embodiment, the obtaining of the plurality of sample images and the annotated sample image corresponding to each of the plurality of sample images may be performed in a plurality of ways. For example, a target object in a sample image can be manually annotated; alternatively, the sample image may be traversed by a sliding window until the target object in the sample image is annotated; or the target region in the sample image can be quickly annotated by using some open source image annotation tools. The open source image annotation tool may be LabelImg, trainingImageLabeler, imageLabeler, BBox-Label-Tool, etc. Here, LabelImg, trainingImageLabeler, imageLabeler, and BBox-Label-Tool are all open-source visualized image annotation tools, after the source code is downloaded, they can be run and used after environment configuration. These open source image annotation tools are used to annotate images by surrounding a target region with an image box such as a rectangular box.

Step 203: input the annotated first image and the annotated second image into a pre-trained matching model, to obtain a matching degree between the annotated first image and the annotated second image.

In the present embodiment, based on the annotated first image and the annotated second image obtained in step 202, the electronic device may input the annotated first image and the annotated second image into a matching model, thereby obtaining a matching degree between the annotated first image and the annotated second image.

In the present embodiment, the electronic device may train a matching model that can characterize the correspondence relationship between the pair of images and the matching degree matching between the images in a plurality of ways.

In some alternative implementations of the present embodiment, the electronic device may generate a correspondence relationship table storing the matching degrees between the large number of image pairs and the matching degrees between images in the image pairs based on the statics on the large number of image pairs and the matching degrees between the images in the image pairs, and use the correspondence relationship table as the matching model. Alternatively, the matching degree may include two types: paired and unpaired. For example, the electronic device may pre-set a similarity threshold value, and mark a matching degree between images in an image pair which corresponds to an image pair the similarity between images thereof is not less than the matching degree threshold value as a paired, and mark a matching degree between images in a image pair which corresponds to an image pair the similarity between images thereof is less than the matching degree threshold value as an unpaired. Then, the electronic device may sequentially compare the first image and the second image to be matched with a plurality of image pairs in the correspondence relationship table, and if a pair of images in the correspondence relationship table are the same as or similar to the first image and the second image, use the matching degree corresponding to the pair of images in the correspondence relationship table as the matching degree between the first image and the second image.

It should be noted that the above matching degree may also include other discrete categories. For example, the matching degree may also include various categories such as unpaired, low-paired, generally-paired, highly-paired, completely-paired, or the like. In addition, the above-mentioned matching degree may also include a plurality of consecutive categories. Alternatively, the matching degree may be a specific value. For example, the matching degree may be any value between 0~1, or may be another value, for example, a specific value of the similarity between two images may be taken as the matching degree of the pair of images. The present disclosure does not impose any limitation on that the matching degree may include any number of discrete or consecutive categories.

In some alternative implementations of the present embodiment, the electronic device may first acquire a plurality of pairs of annotated sample images and a matching degree between the images in each pair of annotated sample images. Then, an initial model for image matching is trained, where the initial model may be an untrained or un-completely trained convolutional neural network configured by using the architecture of an existing Siamese Neural Network, including two identical convolutional neural networks (which may be denoted as a first convolutional neural network and a second convolutional neural network). The outputs of the two convolutional neural networks are used as inputs of a preset contrast function. Alternatively, the above contrast function may adopt a common function for calculating distance, for example, an Euclidean distance, a Manhattan distance, a Chebyshev distance, a Minkowski distance, a standardized Euclidean distance, a Mahalanobis distance, an included angle cosine, a Hamming distance, a Jacquard similarity coefficient, a correlation coefficient, an information entropy, and the like. Specifically, in the training process, one annotated sample image in the pair of annotated sample images is selected and input to the first convolutional neural network in the initial model, the other annotated sample image in the pair of annotated sample images is input to the second convolutional neural network, the outputs of the above two convolutional neural networks are used as the inputs of the contrast function, and the function value of the contrast function is used as the predicted matching degree between the pair of the annotated sample images. Then, based on the error between the predicted matching degree and the obtained matching degree between the images in the pair of annotated sample images, the parameters of the two convolutional neural networks in the initial model are adjusted by using the back propagation algorithm, until the mean error of all the pairs of annotated sample images is less than a certain threshold value, and then it is determined that the matching model is obtained. Alternatively, the absolute value of the difference between the predicted matching degree and the matching degree between the pair of the obtained annotated sample images may be taken as the error therebetween. It should be noted that the above-mentioned back propagation algorithm is a well-known technique currently widely studied and applied, and details are not described herein.

Or alternatively, the predicted matching degree and the matching degree between the images in the pair of acquired sample images may be input to a loss function, where the function value of the loss function may be used to characterize the degree of difference between the predicted matching degree and the matching degree between the images in the pair of acquired sample images, and a smaller function value indicates a smaller degree of difference between the images in the pair of annotated sample images. Alternatively, the above loss function may adopt a common loss function, for example, a 0-1 loss function, an absolute value loss function, a logarithmic loss function, a quadratic loss function, an exponential loss function, a hinge loss function, and the like. The objective of training is to minimize the function value of the loss function, and the parameters of the two convolutional neural networks in the initial model are adjusted according to the function value until the function value of the loss function is minimum, and then it is determined that the matching model is obtained.

It should be noted that during the above-mentioned training of the matching model, the two convolutional neural networks remain exactly the same, that is, the modification of the parameters remains consistent.

In some alternative implementations of the present embodiment, the electronic device may first acquire a plurality of pairs of annotated sample images and a matching degree between the images in each pair of annotated sample images. An initial model for image matching may then be trained, where the initial model may comprise an untrained or a not completely trained convolutional neural network. Two different outputs of the initial convolutional neural network may be used as inputs to a preset contrast function. Alternatively, the above contrast function may use a common function for calculating distance. For example, an Euclidean distance, a Manhattan distance, a Chebyshev distance, a Minkowski distance, a standardized Euclidean distance, a Mahalanobis distance, an included angle cosine, a Hamming distance, a Jacquard similarity coefficient, a correlation coefficient, an information entropy, and the like. Specifically, in the training process, one annotated sample image of the pair of annotated sample images is selected and input to the initial convolutional neural network, and a feature vector (which may be denoted as a feature vector a) of the annotated sample image is obtained, and the obtained feature vector is stored. Then, the other annotated sample image in the pair of annotated sample images is selected and input to the initial convolutional neural network to obtain a feature vector (which may be denoted as feature vector b) of the other annotated sample image, and the obtained feature vector is stored. Then, the feature vector a and the feature vector b are used as inputs of the comparison function, and the function value of the contrast function is used as the predicted matching degree between the pair of annotated sample images. Then, based on the error between the predicted matching degree and the obtained matching degree between the images in the pair of annotated sample images, the parameters of the two convolutional neural networks in the initial model are adjusted by using the back propagation algorithm until the mean error of all the annotated sample image pairs is less than a certain threshold value, and then it is determined that the matching model is obtained. Alternatively, the absolute value of the difference between the predicted matching degree and the obtained matching degree between the obtained images in the pair of annotated sample images may be taken as the error therebetween.

Figure 3A:
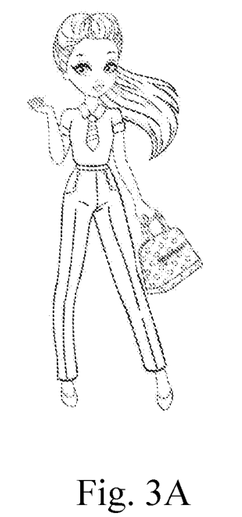
FIG. 3A is a schematic diagram of a first image in a method for generating information according to an embodiment of the present disclosure.
Figure 3B:
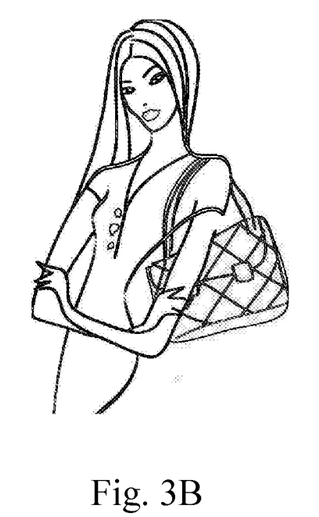
FIG. 3B is a schematic diagram of a second image in a method for generating information according to an embodiment of the present disclosure.
Figure 3C:
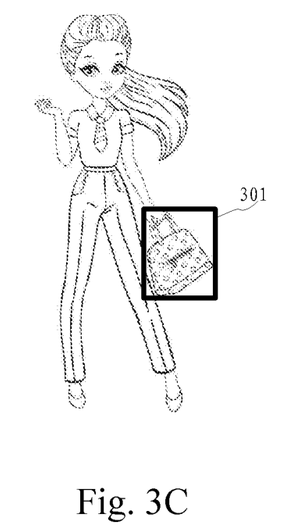
FIG. 3C is a schematic diagram of an annotated first image in a method for generating information according to an embodiment of the present disclosure.
Figure 3D:
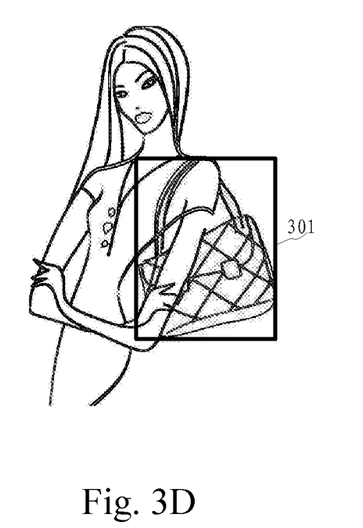
FIG. 3D is a schematic diagram of an annotated second image in a method for generating information according to an embodiment of the present disclosure.

With further reference to FIGS. 3A, 3B, 3C and 3D, FIGS. 3A, 3B, 3C and 3D are schematic diagrams of an application scenario of a method for generating information according to the present embodiment. In the application scenario of FIG. 3, an electronic device (e.g., a computer) for generating information may first acquire two images locally or download two images from a network, or select one image locally and downloaded one image from the network. Any one of the images is selected as the first image (as shown in FIG. 3A), and the other is selected as the second image (as shown in FIG. 3B). In this application scenario, both images show a person carrying a backpack, and assuming that the pre-designated target object is the backpack. Then, the first image and the second image are input to a pre-trained detection and recognition model to obtain an annotated first image (as shown in FIG. 3C) and an annotated second image (as shown in FIG. 3D). Therein, the target objects (i.e., the backpacks) in two images are surrounded by rectangular image boxes (as indicated by reference numeral 301) and the rectangular image boxes are used as the annotations. Note that the annotation indicated by the reference numerals 301 are illustrative only. Next, the annotated first image and the annotated second image are input to a pre-trained matching model to obtain a matching degree of the two annotated images.

According to the method for generating information provided in embodiments of the present disclosure, an acquired first image and a second image are input to a pre-trained detection and recognition model to obtain an annotated first image and an annotated second image, and then the two annotated images are input to a pre-trained matching model to obtain a matching degree between the two annotated images. Since the target object in the image is first annotated through the detection and recognition model, and then the matching degree between the target objects in the two annotated images is calculated through the matching model, instead of calculating the matching degree between the first image and the second image as a whole, the interference of other objects in the image except the target object on the calculation of matching degree is reduced, thereby improving the accuracy of the calculation result of matching degree.

Figure 4:
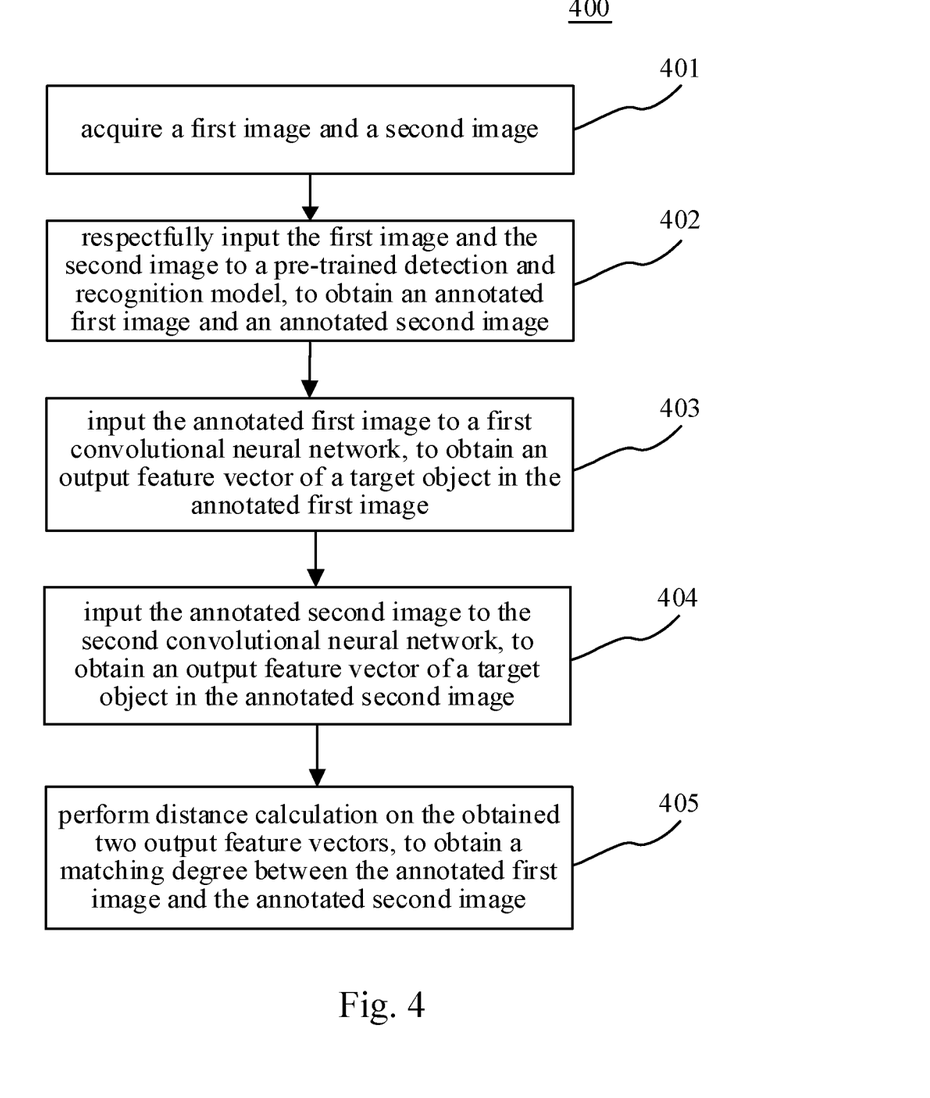
FIG. 4 is a flowchart of a method for generating information according to another embodiment of the present disclosure.

Referring further to FIG. 4, which shows a flow 400 of a method for generating information according to another embodiment. The flow 400 of the method for generating information includes the steps of:

Step 401: acquire a first image and a second image.

In the present embodiment, an electronic device (such as a server shown in FIG. 1) on which a method for generating information operates may acquire a first image and a second image from a terminal device through a wired connection mode or a wireless connection mode.

In step 402, the first image and the second image are respectively input to a pre-trained detection and recognition model to obtain an annotated first image and an annotated second image.

In the present embodiment, based on the first image and the second image acquired in step 401, the electronic device may input the first image and the second image to a detection and recognition model, thereby obtaining an annotated first image and an annotated second image.

It should be noted that the operations of steps 401 and 402 are substantially the same as those of steps 201 and 202, and details are not described herein.

Step 403: input the annotated first image to a first convolutional neural network to, obtain an output feature vector of a target object in the annotated first image.

In this embodiment, based on the annotated first image acquired in step 402, the electronic device may input the annotated first image to the first convolutional neural network, to obtain an output feature vector of a target object in the annotated first image. Alternatively, the matching model includes a first convolutional neural network and a second convolutional neural network.

In the present disclosure, in order to facilitate describing the identical two convolutional neural networks, the two convolutional neural networks are named as a first convolutional neural network and a second convolutional neural network, respectively, it should be understood by those skilled in the art that the first or second herein does not constitute a particular limitation on the convolutional neural network.

In some alternative implementations of the present embodiment, the convolutional neural network includes a convolutional layer, a pooling layer and a full connected layer, and the inputting the annotated first image to the first convolutional neural network to obtain the output feature vector of the target object in the annotated first image includes the steps of:

A first step of inputting an annotated first image to the convolution layer of the first convolution neural network, to obtain a first feature vector of a target object in the annotated first image;

A second step of inputting the first feature vector obtained in the first step to the pooling layer of the first convolutional neural network, to obtain the first feature vector of a preset dimension of the target object in the annotated first image;

And a third step of inputting the obtained first feature vector of the preset dimension to the fully connected layer of the first convolutional neural network, to obtain an output feature vector of the target object in the annotated first image.

Alternatively, the pooling layer may use an ROI (Region Of Interest) pooling layer, so that after the first feature vector output from the convolution layer passes through the pooling layer, first feature vector of a preset dimension can be outputted.

Step 404: input the annotated second image to the second convolutional neural network, to obtain an output feature vector of a target object in the annotated second image.

In this embodiment, based on the annotated second image acquired in step 402, the electronic device may input the annotated second image to the second convolutional neural network, to obtain the output feature vector of the target object in the annotated second image. Alternatively, the matching model includes a first convolutional neural network and a second convolutional neural network.

In some alternative implementations of the present embodiment, the convolutional neural network includes a convolutional layer, a pooling layer, and a fully connected layer, and the inputting the annotated second image to the second convolutional neural network to obtain the output feature vector of the target object in the annotated second image includes the steps of:

A first step of inputting the annotated second image to the convolutional layer of the second convolutional neural network, to obtain a second feature vector of a target object in the annotated second image;

A second step of inputting the second feature vector obtained in the first step to the pooling layer of the second convolutional neural network, to obtain the second feature vector of a preset dimension of the target object in the annotated second image;

And a third step of inputting the obtained second feature vector of the preset dimension to the fully connected layer of the second convolutional neural network, to obtain the output feature vector of the target object in the annotated second image.

Alternatively, the pooling layer may use an ROI (Region Of Interest) pooling layer so that after the second feature vector output from the convolution layer passes through the pooling layer, the second feature vector of the preset dimension can be output.

In some alternative implementations of the present embodiment, the first convolutional neural network and the second convolutional neural network are identical. Alternatively, the first convolutional neural network and the second convolutional neural network have an identical ROI pooling layer for outputting a feature vector of the preset dimension so that the first feature vector and the second feature vector are of an identical dimension after passing through the pooling layer. Since the sizes of the target objects annotated in the annotated first image and the annotated second image acquired in step 402 may be different, after the feature extraction is performed through the layers in the convolutional neural network, the dimensions of the obtained first feature vector and the obtained second feature vector are different. By adding an ROI pooling layer that can be used to convert inputs of different dimensions into outputs of a preset dimension, two convolutional neural networks can output feature vectors of an identical dimension after the pooling layer, thereby facilitating calculation of the matching degree between the two feature vectors thereafter.

And step 405, perform distance calculation on the obtained two output feature vectors, to obtain a matching degree between the annotated first image and the annotated second image.

In the present embodiment, based on the output feature vector of the target object in the first image acquired in step 403 and the output feature vector of the target object in the second image acquired in step 404, the distance between the two feature vectors is calculated to obtain the matching degree between the annotated first image and the annotated second image.

In some alternative implementations of the present embodiment, for the feature vectors obtained in the above steps 403 and 404, the electronic device may perform the distance calculation using various distance calculation methods (such as an Euclidean distance, a Manhattan distance, a Chebyshev distance, a Minkowski distance, a standardized Euclidean distance, a Mahalanobis distance, an included angle cosine, a Hamming distance, a Jacquard similarity coefficient, a correlation coefficient, an information entropy, and the like), and calculate a matching degree between the two feature vectors.

It should be noted that a feature vector outputted from each layer of the convolutional neural network in steps 403 and 404 refer to the extracted feature vector of the target object in the annotated image, rather than the extracted feature vector of the overall input annotated image, so that the matching model outputs the matching degree between the target objects in the two input annotated images in the subsequent step 405. In the present disclosure, the matching degree between the two annotated images refers to the matching degree between the target objects in the two annotated images.

As can be seen from FIG. 4, compared with the embodiments corresponding to FIG. 2, the flow 400 for processing images in this embodiment highlights the step of inputting the obtained annotated first image and the annotated second image to the matching model to obtain the matching degree between the annotated first image and the annotated second image. Inputting the annotated first image to a first convolutional neural network to obtain an output feature vector of a target object in the annotated first image. Inputting the annotated second image to a second convolutional neural network to obtain an output feature vector of a target object in the annotated second image. Then, the outputs of the two convolutional neural networks are subjected to a distance calculation to obtain a match degree between the annotated first image and the annotated second image. In particular, an ROI pooling layer can be used to convert a feature vector of any dimension into a feature vector of a preset dimension. Based on this, it is realized that, for the annotated first image and the annotated second image of different sizes, the matching degree between the annotated first image and the annotated second image can be calculated without adjusting the sizes of the images. Meanwhile, the problem of image distortion caused by adjusting the size of the image by zooming or stretching is avoided, and the accuracy and flexibility of calculating the matching degree are further improved.

Figure 5:
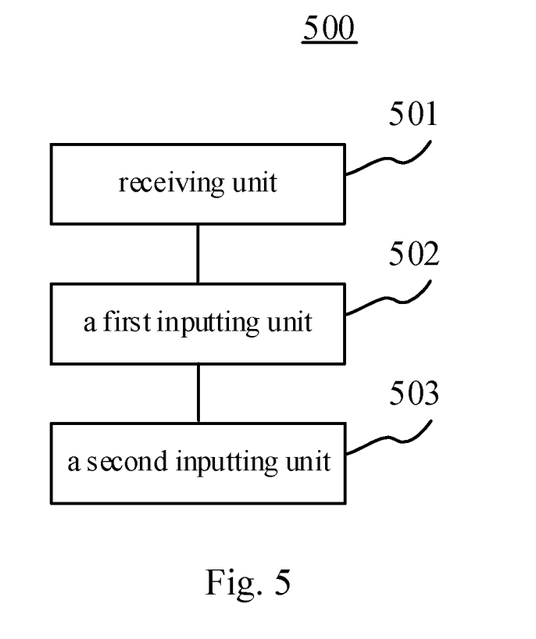
FIG. 5 is a schematic structural diagram of an apparatus for generating information according to an embodiment of the present disclosure.

With further reference to FIG. 5, as an implementation of the method shown in above figures, an embodiment of the present disclosure provides an apparatus for generating information, which corresponds to the method embodiment shown in FIG. 2, and which is particularly applicable to various electronic devices.

As shown in FIG. 5, the apparatus 500 for generating information according to the present embodiment includes a receiving unit 501 configured to acquire a first image and a second image; a first inputting unit 502 configured to input the first image and the second image into a pre-trained detection and recognition model respectively, to obtain an annotated first image and an annotated second image, wherein an annotation comprises an image box surrounding a target object in the image, and the detection and recognition model is used to represent a correspondence relationship between the image and the annotated image; a second inputting unit 503 configured to input the annotated first image and the annotated second image to a pre-trained matching model, to obtain a matching degree between the annotated first image and the annotated second image, wherein the matching model is used to represent a corresponding relationship between the matching degree between a pair of images and the matching degree between the images.

In some alternative implementations of the present embodiment, the detection and recognition model is trained by: between a pair of images and the matching degree between the images; training, by using a machine learning method, with each sample image in the plurality of sample images as an input and the annotated sample image corresponding to each sample image in the plurality of sample images as an output, to obtain the detection and recognition model.

In some alternative implementations of the present embodiment, the matching model is trained by: acquiring a plurality of pairs of annotated sample images and a matching degree between images in each pair of annotated sample images; training, by using a machine learning method, with each pair of annotated sample images in the plurality of pairs of annotated sample images as an input and the matching degree between the images in each pair of annotated sample images as an output, to obtain the matching model.

In some alternative implementations of the present embodiment, the matching model includes a first convolutional neural network and a second convolutional neural network, the convolutional neural network comprises a convolutional layer, a pooling layer, and a fully connected layer.

In some alternative implementations of the present embodiment, the second inputting unit includes an extraction subunit and a calculation subunit (not shown). The extraction subunit is configured to input the annotated first image to the first convolutional neural network, to obtain an output feature vector of the target object in the annotated first image; and inputting the annotated second image to a second convolutional neural network, to obtain an output feature vector of a target object in the annotated second image; The calculation subunit configured to perform a distance calculation on the two obtained feature vectors, to obtain a matching degree between the annotated first image and the annotated second image.

According to the apparatus for generating information provided in the embodiments of the present disclosure, the first image and the second image acquired by the receiving unit 501 are input into a pre-trained recognition and detection model by the first input unit 502, to obtain an annotated first image and an annotated second image, and then the second input unit 503 inputs the annotated first image and the annotated second image output by the first input unit 502 into a pre-trained matching model, to obtain a matching degree between the annotated first image and the annotated second image. Since the target objects in the images are first annotated by the first input unit 501, and then the matching degree between the target objects in the two annotated images, instead of the matching degree between the first image and the second image as a whole, is calculated by the matching model, interference of other objects in the image other than the target object on the calculation of matching degree is reduced, thereby improving accuracy of the matching degree calculation result.

Figure 6:
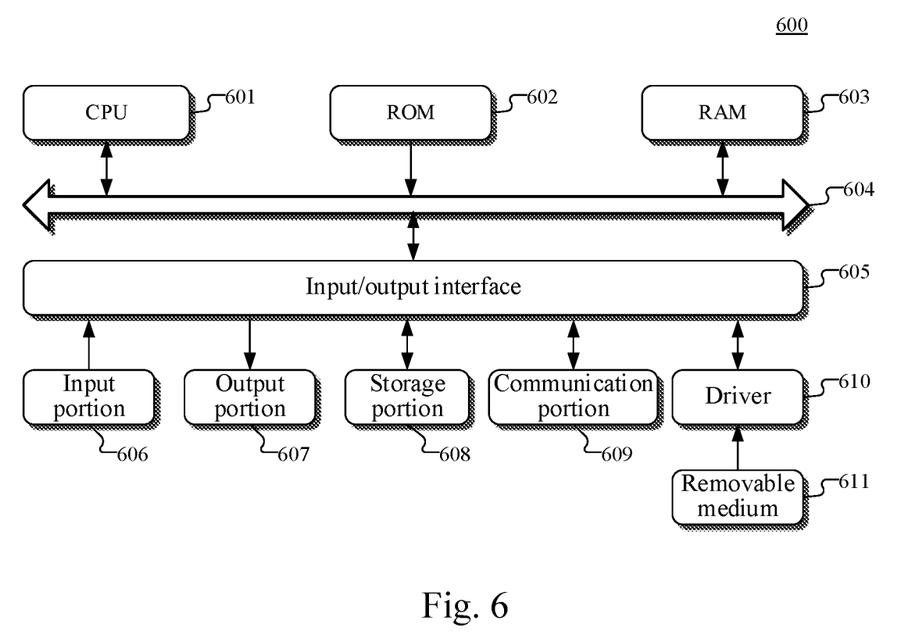
FIG. 6 is a schematic structural diagram of a computer system suitable for implementing a server of an embodiment of the present disclosure.

Referring now to FIG. 6, which shows a schematic structural diagram of a computer system 600 suitable for implementing a server of embodiments of the present disclosure. The server shown in FIG. 6 is merely an example and should not impose any limitations on the functionality and scope of use of the embodiments of the present disclosure.

As shown in FIG. 6, the computer system 600 includes a central processing unit (CPU) 601, which may perform various appropriate actions and processes according to a program stored in a read-only memory (ROM) 602 or a program loaded into a random access memory (RAM) 603 from a storage portion 608. In RAM 603, various programs and data required for the operation of the system 600 are also stored. CPU 601, ROM 602, and RAM 603 are connected to each other via bus 604. An input/output (I/O) interface 605 is also connected to bus 604.

The following components are connected to the I/O interface 605: an input portion 606 including a keyboard, a mouse, or the like; an output portion 607 including a cathode ray tube (CRT), a liquid crystal display (LCD), a speaker or the like; a storage portion 608 including a hard disk or the like; and a communication portion 609 including a network interface card such as a LAN card, a modem, or the like. The communication section 609 performs communication processing via a network such as the Internet. The driver 610 is also connected to the I/O interface 605 as desired. A removable medium 611, such as a magnetic disk, an optical disk, a magneto-optical disk, a semiconductor memory, or the like, is mounted on the driver 610 as required so that a computer program read therefrom is mounted on the storage portion 608 as required.

In particular, according to embodiments of the present disclosure, the process described above with reference to the flow chart may be implemented in a computer software program. For example, an embodiment of the present disclosure includes a computer program product, which comprises a computer program that is hosted in a machine-readable medium. The computer program comprises program codes for executing the method as illustrated in the flow chart. In such an embodiment, the computer program may be downloaded and installed from a network via the communication portion 609, and/or may be installed from the removeable medium 611. The computer program, when executed by the central processing unit (CPU) 601, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any tangible medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, comprising a receiving unit, a first inputting unit and a second inputting unit, where the names of these units or modules do not in some cases constitute a limitation to such units or modules themselves. For example, the receiving unit may also be described as "a unit for acquiring a first image and a second image."

In another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: acquire a first image and a second image; input, respectively, the first image and the second image into a pre-trained detection and recognition model, to obtain an annotated first image and an annotated second image, where an annotation includes an image box surrounding a target object in an image, and the detection and recognition model is used to characterize a correspondence relationship between the image and an annotated image; input the annotated first image and the annotated second image to a pre-trained matching model to obtain a matching degree between the annotated first image and the annotated second image, where the matching model is used to characterize a corresponding relationship between a pair of images and the matching degree between the images.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for generating information, the method comprising:
    acquiring a first image and a second image;
    inputting, respectively, the first image and the second image into a pre-trained detection and recognition model, to obtain an annotated first image and an annotated second image, wherein an annotation includes an image box surrounding a target object in an image, and the detection and recognition model is used to characterize a correspondence relationship between the image and an annotated image; and
    inputting the annotated first image and the annotated second image to a pre-trained matching model to obtain a matching degree between the annotated first image and the annotated second image, wherein the matching model is used to characterize a corresponding relationship between a pair of images and the matching degree between the images in the pair of images.

2. The method for generating information according to claim 1, wherein the detection and recognition model is trained by:
    acquiring a plurality of sample images and an annotated sample image corresponding to each of the plurality of sample images; and
    training, by using a machine learning method, with each sample image in the plurality of sample images as an input and the annotated sample image corresponding to each sample image in the plurality of sample images as an output, to obtain the detection and recognition model.

3. The method for generating information according to claim 2, wherein the matching model is trained by:
    acquiring a plurality of pairs of annotated sample images and a matching degree between images in each pair of annotated sample images; and
    training, by using a machine learning method, with each pair of annotated sample images in the plurality of pairs of annotated sample images as an input and the matching degree between the images in each pair of annotated sample images as an output, to obtain the matching model.

4. The method for generating information according to claim 1, wherein the matching model comprises a first convolutional neural network and a second convolutional neural network.

5. The method for generating information according to claim 4, wherein the inputting the annotated first image and the annotated second image to the pre-trained matching model to obtain the matching degree between the annotated first image and the annotated second image comprises:
    inputting the annotated first image to the first convolutional neural network, to obtain an output feature vector of a target object in the annotated first image;
    inputting the annotated second image to the second convolutional neural network, to obtain an output feature vector of a target object in the annotated second image; and
    performing a distance calculation on the two obtained output feature vectors, to obtain a matching degree between the annotated first image and the annotated second image.

6. An apparatus for generating information, wherein the apparatus comprises:
    at least one processor; and
    a memory storing instructions, the instructions when executed by the at least one processor, cause the at least one processor to perform operations, the operations comprising:
    acquiring a first image and a second image;
    respectfully inputting the first image and the second image into a pre-trained detection and recognition model, to obtain an annotated first image and an annotated second image, wherein an annotation includes an image box surrounding a target object in the image, and the detection and recognition model is used to characterize a correspondence relationship between the image and an annotated image; and
    inputting the annotated first image and the annotated second image to a pre-trained matching model to obtain a matching degree between the annotated first image and the annotated second image, wherein the matching model is used to characterize a corresponding relationship between a pair of images and the matching degree between the images in the pair of images.

7. The apparatus for generating information according to claim 6, wherein the detection and recognition model is trained by:
    acquiring a plurality of sample images and an annotated sample image corresponding to each of the plurality of sample images; and
    training, by using a machine learning method, with each sample image in the plurality of sample images as an input and the annotated sample image corresponding to each sample image in the plurality of sample images as an output, to obtain the detection and recognition model.

8. The apparatus for generating information according to claim 7, wherein the matching model is trained by:
    acquiring a plurality of pairs of annotated sample images and a matching degree between images in each pair of annotated sample images; and
    training, by using a machine learning method, with each pair of annotated sample images in the plurality of pairs of annotated sample images as an input and the matching degree between the images in each pair of annotated sample images as an output, to obtain the matching model.

9. The apparatus for generating information according to claim 6, wherein the matching model comprises a first convolutional neural network and a second convolutional neural network, the convolutional neural network comprises a convolutional layer, a pooling layer, and a fully connected layer.

10. The apparatus for generating information according to claim 9, wherein the inputting the annotated first image and the annotated second image to the pre-trained matching model to obtain the matching degree between the annotated first image and the annotated second image comprises:
    inputting the annotated first image to the first convolutional neural network, to obtain an output feature vector of a target object in the annotated first image;
    inputting the annotated second image to a second convolutional neural network, to obtain an output feature vector of a target object in the annotated second image; and
    performing a distance calculation on the two obtained feature vectors, to obtain a matching degree between the annotated first image and the annotated second image.

11. A non-transitory computer readable storage medium, storing a computer program thereon, the program, when executed by a processor, cause the processor to perform operations, the operations comprising:
  acquiring a first image and a second image;
  inputting, respectively, the first image and the second image into a pre-trained detection and recognition model, to obtain an annotated first image and an annotated second image, wherein an annotation includes an image box surrounding a target object in an image, and the detection and recognition model is used to characterize a correspondence relationship between the image and an annotated image; and
  inputting the annotated first image and the annotated second image to a pre-trained matching model to obtain a matching degree between the annotated first image and the annotated second image, wherein the matching model is used to characterize a corresponding relationship between a pair of images and the matching degree between the images in the pair of images.

12. The medium according to claim 11, wherein the detection and recognition model is trained by:
  acquiring a plurality of sample images and an annotated sample image corresponding to each of the plurality of sample images; and
  training, by using a machine learning method, with each sample image in the plurality of sample images as an input and the annotated sample image corresponding to each sample image in the plurality of sample images as an output, to obtain the detection and recognition model.

13. The medium according to claim 12, wherein the matching model is trained by:
  acquiring a plurality of pairs of annotated sample images and a matching degree between images in each pair of annotated sample images; and
  training, by using a machine learning method, with each pair of annotated sample images in the plurality of pairs of annotated sample images as an input and the matching degree between the images in each pair of annotated sample images as an output, to obtain the matching model.

14. The medium according to claim 11, wherein the matching model comprises a first convolutional neural network and a second convolutional neural network.

15. The medium according to claim 14, wherein the inputting the annotated first image and the annotated second image to the pre-trained matching model to obtain the matching degree between the annotated first image and the annotated second image comprises:
  inputting the annotated first image to the first convolutional neural network, to obtain an output feature vector of a target object in the annotated first image;
  inputting the annotated second image to the second convolutional neural network, to obtain an output feature vector of a target object in the annotated second image; and
  performing a distance calculation on the two obtained output feature vectors, to obtain a matching degree between the annotated first image and the annotated second image.

* * * * *